United States Patent [19]

Morgan et al.

[11] Patent Number: 4,535,540

[45] Date of Patent: Aug. 20, 1985

[54] "HOLE-IN-ONE" METAL PUNCH DRIVE UNIT

[76] Inventors: Michael J. Morgan, 8500 Central, SE., Unit 16, Albuquerque, N. Mex. 87123; Steven G. Gray, 3921 Doroteo Pl., NE., Albuquerque, N. Mex. 87111

[21] Appl. No.: 475,119

[22] Filed: Mar. 14, 1983

[51] Int. Cl.³ ................................ B26F 1/00
[52] U.S. Cl. ....................... 30/358; 30/360; 30/362; 279/9 R
[58] Field of Search ............... 30/360, 367, 362, 366; 279/1 H, 1 DC, 7, 9 R, 99, 1 ME; 408/226, 239

[56] References Cited

U.S. PATENT DOCUMENTS

| 2,293,786 | 8/1942 | Worden | 279/1 DC |
| 2,633,197 | 3/1953 | Nischan | 30/360 |
| 2,896,955 | 7/1959 | Treppared | 279/7 |
| 2,920,913 | 1/1960 | Antila | 279/7 |
| 3,765,790 | 10/1973 | Kubicek | 408/239 X |
| 4,019,827 | 4/1977 | Christianson et al. | 279/1 DC |
| 4,340,328 | 7/1982 | Droulx et al. | 279/9 R |
| 4,403,417 | 9/1983 | Wilson et al. | 30/360 |
| 4,405,269 | 9/1983 | Hertzlen | 408/239 R |

Primary Examiner—E. R. Kazenske
Assistant Examiner—Willimor Fridie, Jr.

[57] ABSTRACT

A combination pilot drill and drive assembly for forming holes in sheet metal panels with one or more draw punches is disclosed. The assembly includes separable drill and drive units which can be cooperably engaged with one another when used to drive a pilot drill, and disengaged when the drive unit alone is used to drive a draw punch. The assembly is ordinarily used with a conventional drill motor, which is used to drive the assembly as a pilot drill and also to drive one or more conventional draw punches with the drive unit alone.

5 Claims, 4 Drawing Figures

"HOLE-IN-ONE" METAL PUNCH DRIVE UNIT

BACKGROUND OF THE INVENTION

The invention disclosed herein is generally related to drills and socket drive tools used for forming holes in sheet metal articles. More particularly, the present invention is related to drive tools for sheet metal draw punches.

Electricians must frequently form holes of various shapes and sizes in sheet metal control boxes, cabinets and panels. Such holes are used for routing electrical conduit, as well as for mounting control switches, indicator lamps and the like. Such holes typically range in size from one-half to two inches in size. The holes are typically formed using draw punches, which are also known in the trade as knock-outs. A draw punch typically includes a female die which receives a male punch. The female die includes a central opening through which is extended a threaded draw shaft, or bolt. The draw shaft is engaged in a central threaded bore in the male punch.

In practice, a pilot hole is first formed in a metal panel at the center of the desired hole location. The pilot hole is sized to receive the draw shaft of a small draw punch. The draw shaft is passed through the female die and thence through pilot hole to be engaged with the male punch on the opposite side of the metal panel. When the draw shaft is tightened, the male punch is drawn into the female die, punching a slug out of the panel. The draw punch is typically driven using a manually driven ratchet drive tool or a hydraulically actuated drive tool.

A single draw punch is used as described above for forming small holes, on the order of one inch or less in diameter. If a larger hole is desired, a two-step punching operation is required, with a small draw punch being used as described above to form a pilot hole for the draw shaft of the larger punch. This two-step operation is required because the larger punches have draw shafts which are normally so large in diameter that it is impractical to form a pilot hole in the ordinary manner with a simple drill.

Thus, the forming of a two-inch hole in a metal panel requires three operations with three separate tools, namely a pilot drilling step using a conventional electric drill and pilot drill bit, and two punching steps. The latter punching steps each require the assembly and disassembly of a draw punch. The overall operation is thus time consuming, particularly because of the assembly and disassembly of the draw punches, and because of the manual driving of the draw punches.

Accordingly, it is an object and purpose of the present invention to provide a combination tool assembly which functions as both a drill unit for forming a pilot hole and as a drive tool for subsequent punching steps using one or more conventional draw punches.

SUMMARY OF THE INVENTION

In accordance with the present invention there is provided a combination pilot drill and drive assembly for use with one or more conventional draw punches for forming holes in sheet metal panels. The assembly comprises a drive unit and a drill unit. The drive unit includes two hex sockets; a large-diameter first tubular socket and a relatively smaller diameter second socket which is slidably enclosed in the first socket. The second socket is spring-loaded so as to be normally urged outwardly toward the open end of the first socket, such that the second socket can be pushed inward when the drive unit is to be engaged with a large diameter bolt or other hex head.

The drill unit includes a tubular casing which fits over the large-diameter tubular socket of the drive unit. At one end of the casing is a drill chuck which is rotatably mounted in the casing and which includes a hex head of the same size as the large diameter hex socket of the drive unit. The drill unit is sized so that the casing may be slipped over the drive unit and the chuck engaged with the large diameter socket of the drive unit.

The drive unit is used in combination with the drill unit to form a pilot hole in a sheet metal panel, using a conventional drill motor to power the assembly. During drilling of the pilot hole the nonrotating casing of the drill unit is held in one hand to guide the drill bit, while the drill motor is actuated with the other hand. The drill unit is then removed and the drive unit is used to engage a conventional draw punch, again using the drill motor to drive the drive unit and punch. If a large diameter hole is desired, the drive unit is used in a subsequent step to drive a larger draw punch in the same manner.

These and other aspects of the present invention are set forth in greater detail in the following description of the preferred embodiment of the invention.

BRIEF DESCRIPTION OF THE DRAWINGS

The accompanying drawings are incorporated in and form a part of the specification. The drawings illustrate a preferred embodiment of the invention which constitutes the best mode contemplated by the inventors of carrying out the invention. In the drawings.

DETAILED DESCRIPTION OF THE INVENTION

Figure 1:
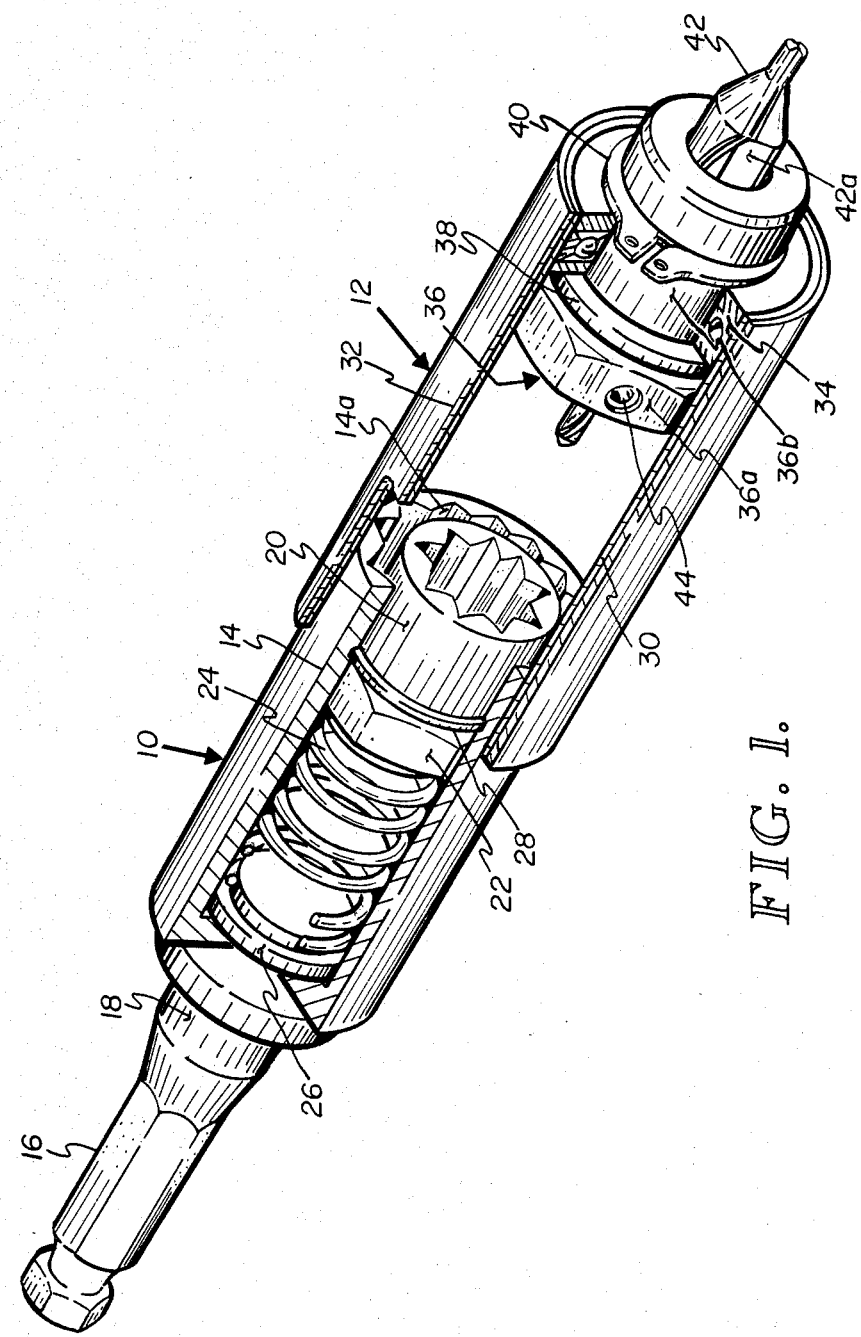
FIG. 1 is an isometric view in partial cross section of the preferred embodiment of the drive tool of the present invention.

Referring to the Figures, the tool consists of two separable parts; a drive unit 10 and a drill unit 12. FIG. 1 illustrates the two units 10 and 12 partially separated. The drive unit 10 includes a tubular socket 14 having an integral 12-point one-inch deep hex drive 14a formed at one end. The drive unit also includes a one-half-inch hex shank 16 which is affixed to the opposite end and aligned with the socket by means of an alignment base 18.

The drive unit 10 contains a spring-loaded 9/16 inch socket 20 which is slidable within the core of the socket 14. The socket 20 is integrally welded to a one-inch hex drive block 22 which is slidably engaged within the flutes of the socket 14, and which prevents rotation of the 9/16 inch socket 20 with respect to the socket 14.

A coil spring 24 is compressed within the core of the socket 14 and urges the 9/16 inch socket outwardly. The spring 24 rests at one end against a rear spring guide 26 and at the other end against the drive block 22. The socket 22 is retained within the core of the socket 14 by means of an outwardly expanding retaining ring 28 which is set into an associated groove formed in the interior surface of the socket 14, and against which abuts the hex drive block 22.

The drill unit 12 includes a tubular brass casing 30 which is encased in a knurled steel casing 32. At one end of the two casings is a thrust bearing 34 which is press fitted into the brass casing 30. The thrust bearing 34 supports a rotatable steel chuck 36. The chuck 36 includes a one-inch hex head 36a and a cylidrical shaft 36b. The chuck is positioned with the hex head inside the casings 30 and 32 and with the cylindrical shaft 36b within the thrust bearing 34. A thrust washer 38 is located on the cylindrical shaft 36b between the hex head 36a and the thrust bearing 34. The chuck 36 is held in place by means of an inwardly expanding retaining ring 40 which is set into a groove in the surface of the cylindrical shaft 36b adjacent the exterior surface of the thrust bearing 34.

The chuck 36 supports a double-ended machinists center drill bit 42. The bit 42 is provided with a flat longitudinal surface 42a having two set screw indentations (not shown). The bit is retained in place by a set screw 44. Access to the set screw 44 is provided by means of an access hole 46 which passes through the casings 30 and 32.

Figure 2:
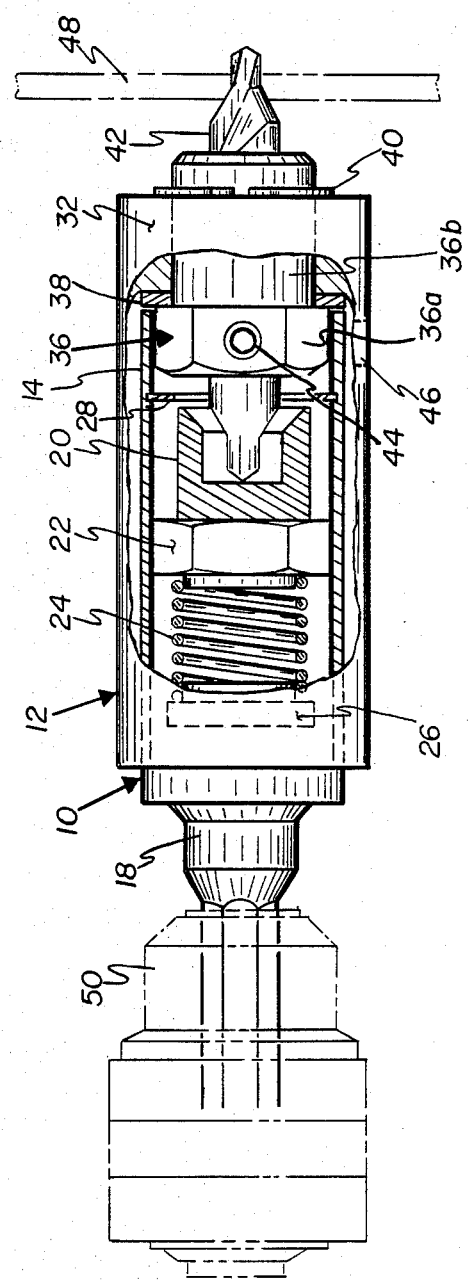
FIG. 2 is a side view in partial cross section of the tool shown in FIG. 1, as it is used to drill a pilot hole in a metal panel.
Figure 3:
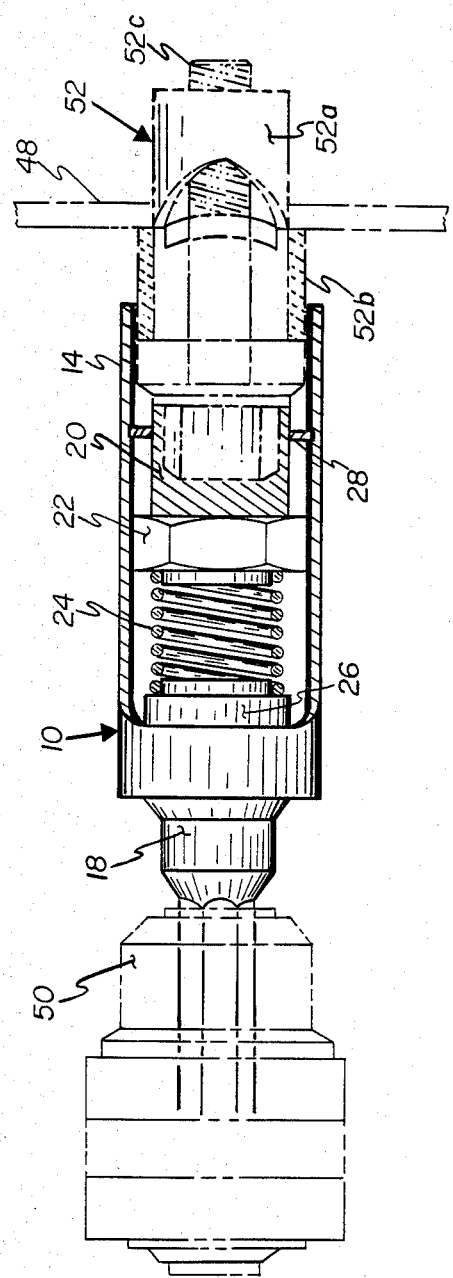
FIG. 3 is a side view in partial cross section of the tool shown in FIG. 1, as used in combination with a small draw punch to punch a hole in the panel.
Figure 4:
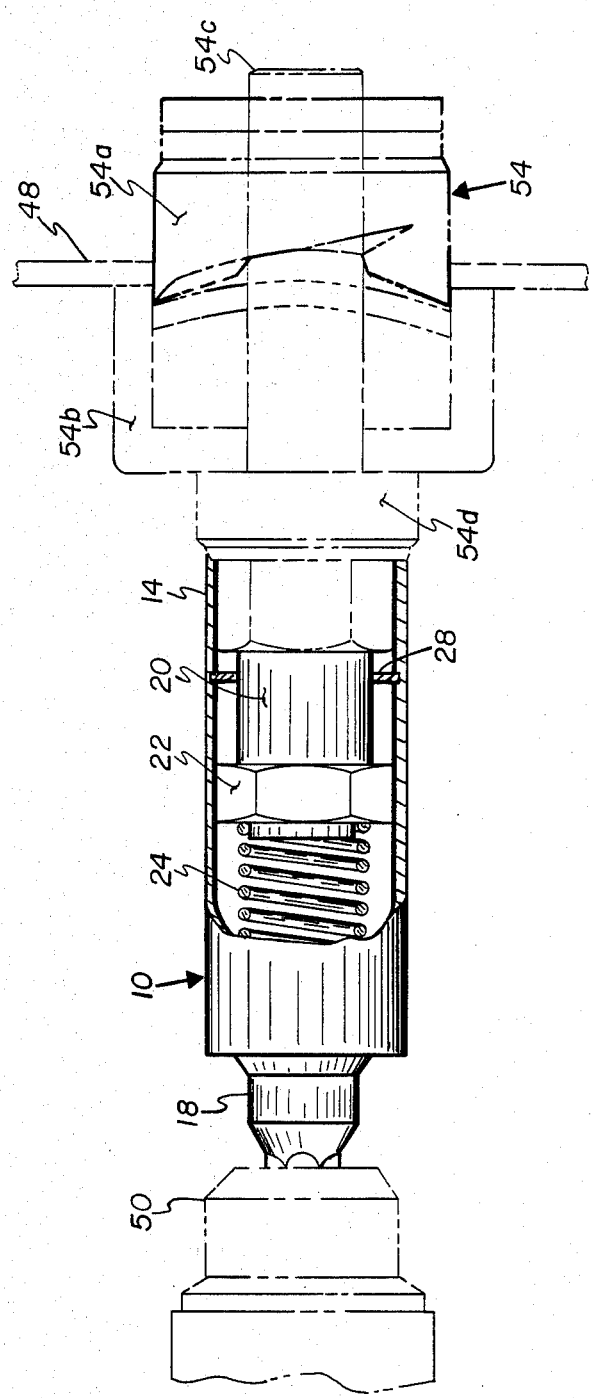
FIG. 4 is a side view in partial cross section of the tool of FIG. 1, as used in combination with a large draw punch to form a large punched hole in the same panel.

FIGS. 2 through 4 illustrate the use of the tool. FIG. 2 shows the tool as it is used to form a pilot hole in a metal panel 48. The drive unit 10 is inserted into the drill unit 12 and the socket 14 engaged with the hex head 36a of the chuck 36. It will be noted that the drill unit 12 must be held so as to compress the spring 24 in order to allow engagement of the large socket 14 with the drill chuck 36. A drill motor (not shown) having a chuck 50 is engaged with the hex shaft 16 of the drive unit. When the drill motor is actuated, the chuck 36 and drill bit 42 are turned, while the knurled casing 32 is held stationary. In this manner the pilot drill bit 42 can be easily positioned while holding the casing 32. The inner casing 30 of the drill unit 12 is made of brass to minimize friction between the stationary drill unit 12 and the rotating steel socket 14 of the drive unit 10 during the drilling process.

FIG. 3 illustrates the next step, in which the drill unit 12 has been removed and the drive unit 10 is being used to drive a small draw punch 52. The draw punch 52 includes a male punch 52a and female die 52b, and a draw bolt 52c. The drive unit 10 is pressed against the head of the draw bolt 52c, engaging the small socket 20 with the head of the draw bolt. Upon actuation of the drill motor, the draw punch is driven in its ordinary manner to punch a hole approximately one inch in diameter in the panel 48.

In the next step, illustrated in FIG. 4, the drive unit 10 is used to drive a large (approximately two-inch diameter) draw punch 54 which includes a male punch 54a, female die 54b, draw bolt 54c, and thrust bearing 54d. The larger diameter draw bolt is inserted through the hole formed by the smaller draw punch in the previous step, and the draw punch assembled as shown. The large socket 14 of the drive unit 10 is engaged with the head of the draw bolt 54c, retracting the small socket 20 and compressing the spring 24 in the process. Upon actuation of the drill motor the punch is driven in its ordinary manner to punch a large diameter hole in the panel 48.

The present invention is particularly well suited for use with a conventional ½-inch electric drill, which is sufficiently powerful to drive both the large and small draw punches mentioned above. As described above, a single drill motor, in combination with the drive unit 10, can be used throughout the operation to form either a small diameter or large diameter punched hole. There is eliminated the need to use separate drive tools to form the pilot hole and the punched holes, resulting in faster and more efficient operation.

Although the present invention is described and illustrated with reference to a preferred embodiment, it will be understood that various modifications, substitutions and alterations may be made without departing from the essential invention. Accordingly, the scope of the invention is defined by the following claims.

What is claimed is:

1. A combination pilot drill and drive assembly for use with one or more draw punches, comprising:

a drill unit including a tubular casing and a drill chuck for holding a pilot drill rotatably mounted at one end thereof, said drill chuck including a hex head located inside said dirve casing; and a drive unit including a tubular large diameter first socket and a relatively smaller diameter second socket slidably engaged therein, said second socket being springloaded so as to be normally urged outwardly toward the open end of said first socket; said casing of said drill unit being sized to fit over said first socket of said drive unit, and said hex head of said drill chuck being sized to engage said first socket, whereby said drill unit may be selectively coupled to said drive unit for use of said drill and drive units in combination in a first mode of use as a pilot drill for drilling a pilot hole in a metal panel, and whereby said drill unit may be removed from said drive unit for use of said drive unit alone in a second mode of use to engage by means of one of said sockets a draw punch for punching a hole in a metal panel.

2. The assembly defined in claim 1 wherein said drill chuck is rotatably mounted in said casing by means of a thrust bearing, said chuck having an integral hex head and a cylindrical shaft, and wherein said shaft passes through said thrust bearing, and wherein said chuck is maintained in position within said thrust bearing by means of a retaining ring engaged in an external groove in said cylindrical shaft adjacent said thrust bearing.

3. The assembly defined in claim 2 further comprising a thrust washer interposed between said hex head of said chuck and said thrust bearing of said drill unit.

4. The assembly defined in claim 1 further comprising a double-ended drill bit secured in said chuck, a set screw for securing said bit in said chuck, and wherein said casing of said drill unit includes an access hole centered on set screw to permit removal or reversal of of the drill bit.

5. The assembly defined in claim 1 further comprising a coil spring located within said first socket for driving said second socket toward the open end of said first socket, and an outwardly expanding retaining ring engaged in an interior groove in said first socket, said retaining ring being located so that said second socket is driven outwardly by said spring to a limit position wherein the opening of the second socket is flush with the opening of the first socket.

* * * * *